United States Patent [19]
Casey et al.

[11] 3,990,538
[45] Nov. 9, 1976

[54] CAPSULE LUBRICATOR

[75] Inventors: Robert Casey, Washington; Leon E. Hicks, Joliet, both of Ill.

[73] Assignee: Caterpillar Tractor Co., Peoria, Ill.

[22] Filed: Jan. 6, 1975

[21] Appl. No.: 539,203

[52] U.S. Cl. .................................. 184/1 R; 64/23
[51] Int. Cl.² .................... F16N 1/00; F16N 9/02
[58] Field of Search ................ 184/14, 6.12, 6.19, 184/17 R, 7 A, 9, 26, 27 R, 31, 43, 54, 65, 70, 76, 77, 80, 82, 89, 105 R, 105 A, 6, 1 R, 6.11; 60/39.08; 221/197, 198; 222/192, 325, 215; 64/23, 23.5

[56] References Cited
UNITED STATES PATENTS

| | | | |
|---|---|---|---|
| 235,679 | 12/1880 | Glover | 64/23 |
| 1,006,075 | 10/1911 | Foster | 184/89 UX |
| 2,717,661 | 9/1955 | Mayfield | 184/14 |
| 3,242,695 | 3/1966 | Ross, Jr. | 64/23 |
| 3,577,746 | 5/1971 | Dolan | 64/23 |
| 3,605,947 | 9/1971 | Salerno | 184/15 R |
| 3,621,937 | 11/1971 | Edge et al. | 60/39.08 X |
| 3,785,458 | 1/1974 | Caldwell et al. | 184/6.12 |
| 3,847,248 | 11/1974 | Avery | 184/1 R |

FOREIGN PATENTS OR APPLICATIONS

| | | | |
|---|---|---|---|
| 713,389 | 7/1965 | Canada | 184/6.19 |
| 80,134 | 2/1963 | France | 184/6.19 |
| 379,410 | 9/1932 | United Kingdom | 222/192 |
| 1,215,894 | 12/1970 | United Kingdom | 184/6.11 |

*Primary Examiner*—Richard C. Pinkham
*Assistant Examiner*—Arnold W. Kramer
*Attorney, Agent, or Firm*—Phillips, Moore, Weissenberger, Lempio & Strabala

[57] ABSTRACT

A spline lubricating device comprises a capsule defining a chamber filled with lubricating fluid on one end of a splined shaft. The splined shaft and lubricating capsule is inserted into an internally splined member which contains a centrally disposed slinger, and a plunger mounted in the slinger for engaging the capsule for releasing the fluid from the lubricating capsule with the slinger directing the fluid to the spline teeth.

9 Claims, 3 Drawing Figures

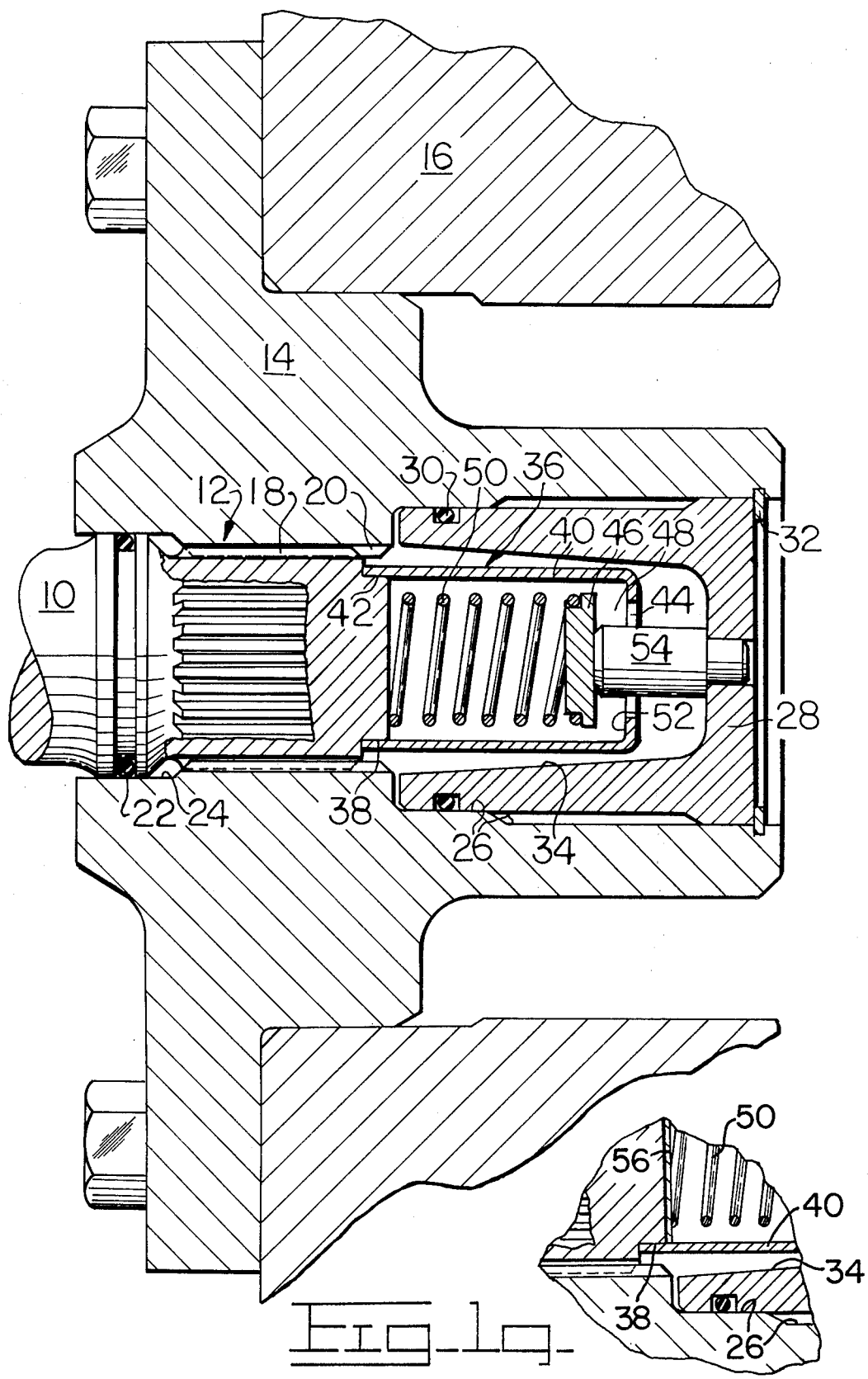

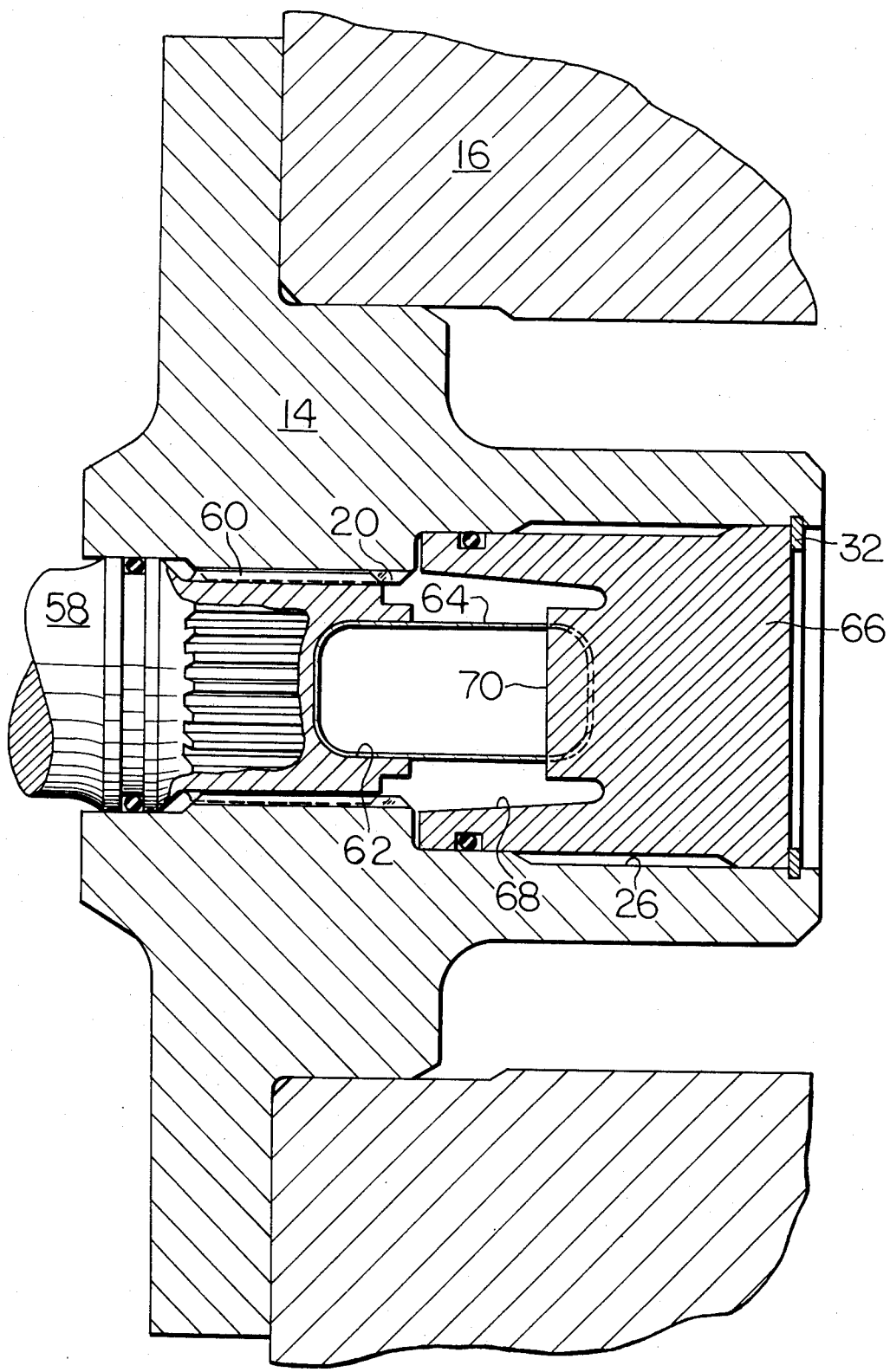
Fig_2_

CAPSULE LUBRICATOR

BACKGROUND OF THE INVENTION

Splines are commonly employed for connecting shafts and other rotating members together for simultaneous rotation. One of the major problems frequently encountered with spline connections is the problem of fretting and corrosion caused in part by minute movements between the members in the spline connection. Lack of adequate seals and lubrication within the spline area also contribute to fretting corrosion.

Splines are frequently employed in places which are not readily accessible for lubrication. Such lack of lubrication contributes to fretting, corrosion and other problems.

SUMMARY AND OBJECTS OF THE INVENTION

In accordance with the invention, a lubricating capsule is provided which includes a chamber for containing a quantity of lubricant, and means for releasing lubricant from the chamber when the capsule is in place in a coupling. The capsule is connected to or mounted to the end of a splined shaft adjacent the spline connection to a second member and is operative to dispense lubricant into a slinger which distributes the lubricant to the spline area.

It is accordingly a primary object of the present invention to provide a simple, inexpensive and effective lubricating device for spline shaft couplings.

Another object of the present invention is to provide a capsule lubricator insertable into an area adjacent to a spline coupling and effective to dispense lubricant to the splined area.

BRIEF DESCRIPTION OF THE DRAWING

The above and other objects and advantages of the present invention will become apparent from the following specification when read in conjunction with the accompanying drawing, wherein:

FIG. 1 is an elevational view in section of a spline coupling incorporating a preferred embodiment of the present invention;

FIG. 1a is a portion of an assembly like FIG. 1 showing a modification of the capsule.

FIG. 2 is a view like FIG. 1 of an alternate embodiment.

DETAILED DESCRIPTION OF THE PREFERRED EMBODIMENT

Referring now to FIG. 1, a shaft 10 which may be either a driving or driven shaft is coupled by means of a spline connection indicated generally at 12 to a member 14 which in turn is connected in a suitable manner to another rotatable member 16. The spline connection 12 includes external splines 18 formed on shaft 10 and internal splines 20 formed in a bore of coupling member 14. Suitable sealing means such as an O-ring 22 provides sealing between the shaft 10 and bore 24 of coupling member 14.

A chamber of step bore 26 is formed in coupling member 14 coaxially with a bore 24 and extends beyond the end of shaft 10. A closure and slinger member 28 is sealingly positioned within bore 26 by means of suitable seal means such as an O-ring 30 and retained in place by suitable means such as a retaining ring 32. The closure member 28 is provided with a substantially conical shaped inner bore 34 extending toward the spline connection 12 and defines slinger means for conveying lubricant to the splined area during rotation of the member 10 and 14.

A lubricating capsule generally indicated at 36 is disposed within the bore 34 and mounted on an outer cylindrical extension 38 of shaft 10 for containing and dispensing lubricant into the spline area. The capsule comprises a generally cylindrical housing 40 having a socket 42 formed at one end for receiving extension 38 of shaft 10 and an opening 44 at the other end from which to dispense lubricant. A valve member 46 is disposed within the chamber 48 defined by housing 40 and is biased by means of spring 50 into engagement with walls 52 of housing 40 defining the wall surrounding opening 44. The capsule is normally closed when mounted on the extension 38 of shaft 10 and prior to engagement of plunger 54 of valve 46. A stationary plunger 54 is fixed to and extends inward from closure member 28 for engagement with valve member 46 when the shaft 10 is extended into engaging relationship with coupling member 14 with capsule 36 in place. This plunger 54 actuates or moves valve 46 to the open position to permit lubricant contained within chamber 48 to flow outward by way of opening 44 into slinger area 34 where it is transferred by means of rotary or centrifugal force from rotary action of members 10 and 14 to the spline area 12.

The capsule housing 40 may include a wall 56 at the inner end as shown in FIG. 1a, if needed and the capsule may be dispensable or not as desired. With this modification the capsule is normally closed prior to mounting on the end of shaft 10.

Turning now to FIG. 2 there is illustrated an alternate embodiment of the present invention wherein identical elements are identified by the same reference numerals, with equivalent elements identified by the same numeral primed. In this embodiment a splined shaft 58 which is substantially like the splined shaft of the previous embodiment includes splines 60 engaging splines 20 of rotary member 14. The shaft further includes at its forward end a blind bore 62 for receiving a substantially cylindrical-shaped container 64 which defines a reservoir containing a lubricant. A closure and slinger member 66 fits within bore 26 of member 14 for enclosing the opening thereof and includes a central tapered bore 68 which substantially encompasses the capsule 64 and is defined by tapered walls which are effective to convey lubricant to the spline when the assembly is rotating.

An axially extending member of suitable form, such as a knife edge 70, engages the end of capsule 64 for penetrating the capsule and effecting an opening thereof to permit the escape of lubricant therefrom. This member 70, of course, can take the form of a sharp point or any other suitable configuration for penetrating the capsule 64 and effecting an opening thereof. The capsule 64 may be of any suitable material which is readily susceptible to being penetrated by a knife edge or sharp point. The capsule may, for example, be made of a soft metal or any number of known plastic materials.

With either of the above constructions a capsule containing a lubricant is disposed in a cavity adjacent a splined coupling with means in the cavity for engaging and effecting an opening in the cavity for permitting the lubricant to flow therefrom into the spline coupling. This arrangement provides for lubricant to begin its effectiveness when the spline coupling is assembled and to continue throughout the life of the capsule.

Thus, from the above description, it is seen that there is provided a simple and effective lubricating assembly comprising a capsule disposed at the end of a shaft adjacent the spline coupling and cooperative with slinger means to dispense lubricant into the spline area.

While the invention has been disclosed and described with respect to a single embodiment, it is to be understood that numerous changes and modifications may be made in the invention without departing from the spirit and scope of the invention as defined by the appended claims.

What is claimed is:

1. A lubricating system for a splined coupling between a pair of rotatable members comprising:
    an internally splined member and an externally splined member;
    a bore formed in and as an extension of said internally splined member adjacent to and coaxial with said splined coupling;
    closure means having a cavity opening towards said splined coupling positioned within said bore;
    a container defining a reservoir for containing a quantity of lubricant;
    means for removably mounting said container on the end of said externally splined member with the major portion of said container extending into said cavity;
    a plunger mounted in said cavity; and,
    means associated with said container for engagement by said plunger for opening said container when said splines are engaged for permitting flow of lubricant from said reservoir into said cavity and to said splines.

2. The lubricating system of claim 1 wherein said container is a cylindrical shaped container open at one end for closure by being mounted on one end of said externally splined member.

3. The lubricating system of claim 1 wherein said closure means defines slinger means for directing lubrication from said container to said splines during rotation of said members.

4. The lubricating system of claim 3 wherein said closure means comprises a cup-shaped member having walls opening and diverging toward said splined coupling for defining said slinger means.

5. The lubricating system of claim 4 wherein said plunger is mounted in said cup shaped member.

6. The lubricating system of claim 4 wherein said means associated with said container for engagement by said plunger comprises a penetratable wall, and said plunger includes a knife-like edge for cutting and penetrating the wall of said container when said splines are engaged.

7. The lubricating system of claim 1 wherein said means associated with said container for engagement by said plunger comprises a penetratable wall, and said plunger includes a sharp portion penetrating said wall of said container when said splines are engaged.

8. The lubricating system of claim 1 wherein said container defining said reservoir is a cylindrical container that includes a socket on one end for receiving the end of said externally splined member; and,
    said means associated with said container for engagement by said plunger comprises valve means mounted in the other end of said container for engagement by said plunger to effect said opening.

9. The lubricating system of claim 1 wherein said means associated with said container includes a spring biased check valve in one end thereof and said plunger engages and opens said check valve when said splines are engaged.

* * * * *